(12) United States Patent
Nie et al.

(10) Patent No.: US 11,854,429 B2
(45) Date of Patent: Dec. 26, 2023

(54) PORTABLE SIMULATED FLOOD DISCHARGE CULVERT FOR SURVEYING AND MAPPING

(71) Applicant: SINOSTEEL MAANSHAN GENERAL INSTITUTE OF MINING RESEARCH CO., LTD, Ma'anshan (CN)

(72) Inventors: Wen Nie, Ma'anshan (CN); Xiuping Xu, Ma'anshan (CN); Haosheng Zhang, Ma'anshan (CN); Bibo Dai, Ma'anshan (CN); Yuxin Zhou, Ma'anshan (CN); Canming Yuan, Ma'anshan (CN)

(73) Assignee: SINOSTEEL MAANSHAN GENERAL INSTITUTE OF MINING RESEARCH CO., LTD, Ma'anshan (CN)

( * ) Notice: Subject to any disclaimer, the term of this patent is extended or adjusted under 35 U.S.C. 154(b) by 0 days.

(21) Appl. No.: 18/343,265

(22) Filed: Jun. 28, 2023

(65) Prior Publication Data

US 2023/0343245 A1 Oct. 26, 2023

Related U.S. Application Data

(63) Continuation of application No. PCT/CN2022/133354, filed on Nov. 22, 2022.

(30) Foreign Application Priority Data

Apr. 20, 2022 (CN) .......................... 202210416697.5

(51) Int. Cl.
G09B 25/06 (2006.01)

(52) U.S. Cl.
CPC .................................. *G09B 25/06* (2013.01)

(58) Field of Classification Search
None
See application file for complete search history.

(56) References Cited

U.S. PATENT DOCUMENTS

| 4,673,159 A | 6/1987 | Schmidgall |
| 4,969,626 A | 11/1990 | Strauch |

FOREIGN PATENT DOCUMENTS

| CN | H11165310 A | 6/1999 |
| CN | 104655822 A | 5/2015 |

(Continued)

*Primary Examiner* — James B Hull
(74) *Attorney, Agent, or Firm* — Rachel Pilloff; Sean Passino; Martin Cosenza

(57) ABSTRACT

Provided is a portable simulated flood discharge culvert for surveying and mapping, including a supporting device, where the supporting device includes a plurality of telescopic support rods, and the telescopic support rods; a tarpaulin, where the tarpaulin is cover on outer walls of the telescopic support rods; connecting devices, where each of the connecting devices is installed between any two adjacent telescopic support rods; floors, where the floors are respectively arranged between the plurality of telescopic support rods, and top surfaces of the floors are provided with a plurality of protrusions; adjusting devices, where each of the adjusting devices includes angle adjusting mechanisms and a height adjusting mechanism, and the angle adjusting mechanisms and the height adjusting mechanism are respectively fixed on a bottom surface of each of the floors; a fog generating device, a lighting part, and additional blocks.

8 Claims, 4 Drawing Sheets

(56) References Cited

FOREIGN PATENT DOCUMENTS

| | | | |
|---|---|---|---|
| CN | 204389490 | A | 6/2015 |
| CN | 206070402 | U | 4/2017 |
| CN | 111469403 | A | 7/2020 |
| CN | 111809536 | A | 10/2020 |
| CN | 113776965 | A | 12/2021 |
| CN | 114694473 | A | 7/2022 |

PORTABLE SIMULATED FLOOD DISCHARGE CULVERT FOR SURVEYING AND MAPPING

CROSS-REFERENCE TO RELATED APPLICATIONS

This disclosure is a continuation of PCT/CN2022/133354, filed Nov. 22, 2022 and claims priority of Chinese Patent Application No. 202210416697.5, filed on Apr. 20, 2022, the contents of which are hereby incorporated by reference.

TECHNICAL FIELD

The disclosure relates to the technical field of geotechnical experimental devices, and in particular to a portable simulated flood discharge culvert for surveying and mapping.

BACKGROUND

A culvert refers to a drainage tunnel (water channel) under a subgrade and under a pavement in highway engineering construction, in order to make a highway pass through a canal smoothly and not hinder traffic. Water may flow under the highway through this structure.

In the prior art, most of surveying and mapping of the culvert adopts a direct field survey. This method has problems that due to a complex environment of the culvert, a surveying and mapping device is affected by the environment, so errors between surveying and mapping values and actual values are large, and surveying and mapping data may not be truly and intuitively reflected. Moreover, the field survey has a large workload and a high cost. Based on this, a portable simulated flood discharge culvert for surveying and mapping is proposed, so as to realize the surveying and mapping of the simulated culvert in a laboratory.

SUMMARY

An objective of the disclosure is to provide a portable simulated flood discharge culvert for surveying and mapping, so as to solve problems existing in the prior art.

In order to achieve the above objective, the disclosure provides a following scheme. The disclosure provides a portable simulated flood discharge culvert for surveying and mapping, including:

a supporting device, where the supporting device includes a plurality of telescopic support rods, and the telescopic support rods have U-shaped structures, and openings of the telescopic support rods are downward;

a tarpaulin, where the tarpaulin is cover on outer walls of the telescopic support rods, and a channel with two ends communicated is formed between the plurality of telescopic support rods and the tarpaulin;

connecting devices, where each of the connecting devices is installed between any two adjacent telescopic support rods;

floors, where a plurality of floors are provided, and the plurality of floors are respectively arranged between the plurality of telescopic support rods, and top surfaces of the floors are provided with a plurality of protrusions;

adjusting devices, where each of the adjusting devices includes angle adjusting mechanisms and a height adjusting mechanism, and the angle adjusting mechanisms and the height adjusting mechanism are respectively fixed on a bottom surface of each of the floors, and the angle adjusting mechanisms are fixed on two sides of the height adjusting mechanism;

a fog generating device, where the fog generating device is installed on any of the telescopic support rods;

a lighting part, where the lighting part is fixedly connected to one of the telescopic support rods located in a middle section; and additional blocks, where there are a plurality of additional blocks, and the plurality of additional blocks are all arranged on the telescopic support rods.

Optionally, each of the connecting devices includes two hinged rods, where middle parts of the two hinged rods are hinged by a rotating shaft, and two ends of each of the two hinged rods are respectively hinged with mounting blocks, and the mounting blocks are provided with clamping grooves. Side walls of the telescopic support rods are fixedly connected with first slide bars, and each of the mounting blocks is slidably clamped on corresponding one of the first slide bars through corresponding one of the clamping grooves. Chutes are formed on two opposite side walls of each of the clamping grooves, and ball cups are arranged in the chutes, and balls are rotatably arranged on the ball cups. The balls are in sliding fit with an outer wall of each of the first slide bars. A side of each of the ball cups away from each of the balls is fixedly connected with a sliding sleeve, and a second slide bar is slidably connected in the sliding sleeve. One end of the second slide bar is fixedly connected in each of the chutes, and a first spring is sleeved outside the sliding sleeve, and both ends of the first spring are fixedly connected with corresponding one of the ball cups and an inner wall of corresponding one of the chutes respectively. Limiting pieces are installed on side walls of each of the clamping grooves, and the limiting pieces are in limiting fit with side walls of each of the first slide bars.

Optionally, each of the limiting pieces includes an anti-skid block. The side walls of each of the clamping grooves are provided with mounting grooves, axes of the mounting grooves are perpendicular to an axis of each of the first slide bars. The anti-skid block is slidably arranged in each of the mounting grooves. One side of the anti-skid block is in contact fit with a side wall of each of the first slide bars, and an other side of the anti-skid block is fixedly connected with a sleeve. A side wall of each of the mounting grooves is provided with a threaded hole, and the threaded hole is threadedly connected to a bolt, and one end of the bolt is sleeved inside the sleeve and abuts against a side of the anti-skid block away from each of the first slide bars. An outer wall of the sleeve is sleeved with a second spring. One end of the second spring is fixedly connected with an inner wall of each of the mounting grooves, and an other end of the second spring is fixedly connected with the anti-skid block.

Optionally, the height adjusting mechanism includes a support block, where a cavity is formed in the support block, and a cushion block is slidably connected in the cavity. A bottom surface of the cushion block is fixedly connected with one end of a third spring, and an other end of the third spring is fixedly connected with a bottom wall of the cavity. A top end of the cushion block is fixedly connected with a connecting rod, where one end of the connecting rod penetrates a top wall of the cavity and fixes a middle section of a connecting shaft. The bottom surface of each of the floors is fixedly connected with a bearing seat, and the connecting shaft is rotatably connected to the bearing seat. And the angle adjusting mechanisms are fixedly connected to two sides of the support block.

Optionally, each of the angle adjusting mechanisms includes a fixed block fixedly connected to a side wall of the support block, a fixed end of an electric telescopic rod is hinged to one side of the fixed block away from the support block, and a fixed plate is hinged to an output end of the electric telescopic rod. The fixed plate is slidably connected to a bottom surface of one of the floors, and the electric telescopic rod is arranged at an angle with the bottom surface of the one of the floors.

Optionally, each of the telescopic support rods includes two first connecting rods. Top ends of the two first connecting rods are fixedly connected with length adjusting elements, and top ends of the length adjusting elements are fixedly connected with second connecting rods. The second connecting rods are arranged in L-shapes, and ends of the two second connecting rods close to each other are provided with one of the length adjusting elements, and the one of the length adjusting elements is fixedly connected with the two second connecting rods respectively, and universal wheels are installed at bottom ends of the first connecting rods.

Optionally, each of the length adjusting elements includes two threaded rods, and a threaded sleeve is threadedly connected between the two threaded rods, and one end of each of a plurality of threaded rods away from the threaded sleeve is fixedly connected with the top end of each of the first connecting rods and two ends of each of the second connecting rods respectively.

Optionally, the lighting part includes a light-emitting diode (led) charging lamp, and one of the second connecting rods is fixedly connected with a hook, and the led charging lamp is hung on the hook.

Optionally, the fog generating device includes a fogger, and a mounting bracket is fixedly connected to a side wall of one of the second connecting rods away from the tarpaulin, and the fogger is placed on the mounting bracket.

Optionally, a cross-sectional shape of each of the additional blocks is a regular polygon.

The disclosure discloses following technical effects. A surveying and mapping device according to the disclosure adopts a wheeled robot equipped with a laser radar. When the disclosure is used, firstly, the telescopic support rods are unfolded through the connecting devices. After the telescopic support rods are unfolded, the tarpaulin is covered outside the telescopic support rods, so that the device forms the channel with openings at both ends. Then, the floors are laid in the channel, and the fog generating device, the lighting part and the additional blocks are all installed in the channel. Finally, the wheeled robot is placed on the floors and travels along a preset route of the floors. Heights and angles of the floors may be adjusted by setting of the adjusting devices, so that the floors may simulate an actual slope. A shape of a local position may be changed by setting of the additional blocks, and surveying and mapping results of the device when deformation occurs in a local area within the culvert may be simulated. Moreover, the floors are provided with the protrusions to simulate bumps in an actual state. According to the disclosure, an experimental environment is built aiming at a specific environment of the flood discharge culvert, so as to restore a real flood tunnel environment as much as possible, simulate a complex environment inside the flood tunnel and realize artificial control of variables, and detect a difference between a shape variable of the flood discharge culvert mapped by the device after scanning and a shape variable of the flood discharge culvert under an actual situation in the complex environment, so as to judge the shape variable of the flood discharge culvert in a subsequent actual mapping process.

BRIEF DESCRIPTION OF THE DRAWINGS

In order to explain technical schemes of the disclosure or technical schemes in the prior art more clearly, drawings needed in embodiments are briefly introduced below. Obviously, the drawings in a following description are only some embodiments of the disclosure. For ordinary people in the field, other drawings may be obtained according to these drawings without paying a creative labor.

DETAILED DESCRIPTION OF THE EMBODIMENTS

Figure 1:
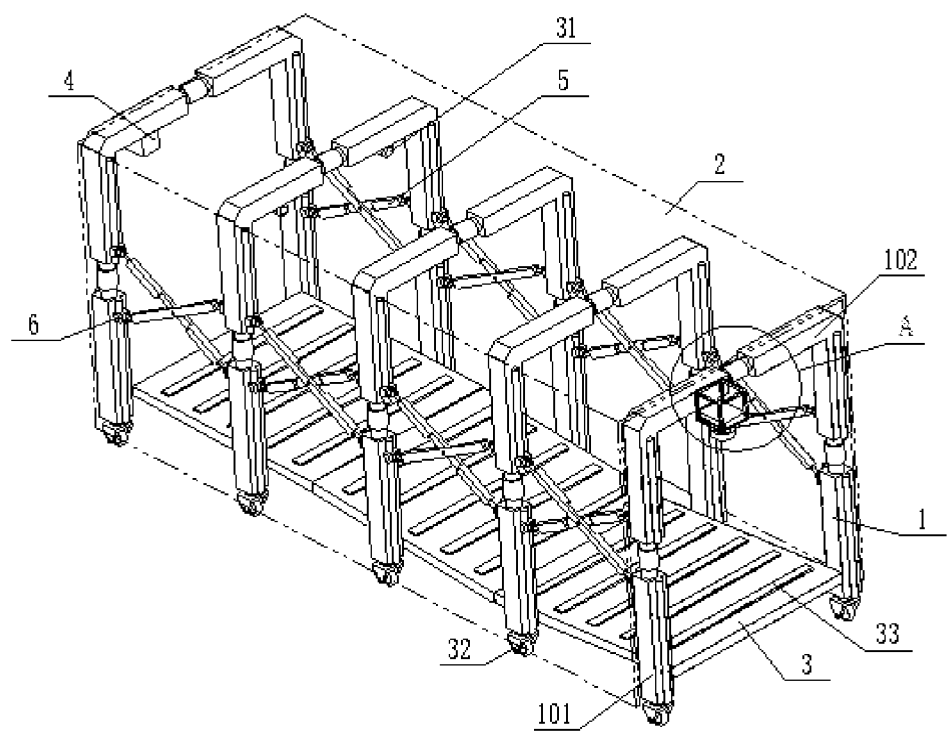
FIG. 1 is an axonometric view of a portable simulated flood discharge culvert for surveying and mapping.

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative labor belong to a protection scope of the disclosure.

In order to make above objects, features and advantages of the disclosure more obvious and easier to understand, the disclosure may be further described in detail with the attached drawings and specific embodiments.

Embodiment 1

As shown in FIG. 1, FIG. 2, FIG. 3, and FIG. 4, the disclosure provides a portable simulated flood discharge culvert for surveying and mapping, including:

a supporting device, where the supporting device includes a plurality of telescopic support rods 1, and the telescopic support rods 1 have U-shaped structures, and openings of the telescopic support rods 1 are downward;

a tarpaulin 2, where the tarpaulin 2 is cover on outer walls of the telescopic support rods 1, and a channel with two ends communicated is formed between the plurality of telescopic support rods 1 and the tarpaulin 2;

connecting devices, where each of the connecting devices is installed between any two adjacent telescopic support rods 1;

floors 3, where a plurality of floors 3 are provided, and the plurality of floors 3 are respectively arranged between the plurality of telescopic support rods 1, and top surfaces of the floors 3 are provided with a plurality of protrusions 33;

adjusting devices, where each of the adjusting devices includes angle adjusting mechanisms and a height adjusting mechanism, and the angle adjusting mechanisms and the height adjusting mechanism are respectively fixed on a bottom surface of each of the floors 3, and the angle adjusting mechanisms are fixed on two sides of the height adjusting mechanism;

a fog generating device, where the fog generating device is installed on any of the telescopic support rods 1;

a lighting part, where the lighting part is fixedly connected to one of the telescopic support rods 1 located in a middle section; and additional blocks 4, where there are a plurality of additional blocks 4, and the plurality of additional blocks 4 are all arranged on the telescopic support rods 1.

A surveying and mapping device according to the disclosure adopts a wheeled robot equipped with a laser radar. When the disclosure is used, firstly, the telescopic support rods 1 are unfolded through the connecting devices. After the telescopic support rods 1 are unfolded, the tarpaulin 2 is covered outside the telescopic support rods 1, so that the device forms the channel with openings at both ends. Then, the floors 3 are laid in the channel, and the fog generating device, the lighting part and the additional blocks 4 are all installed in the channel. Finally, the wheeled robot is placed on the floors 3 and travels along a preset route of the floors 3. Heights and angles of the floors 3 may be adjusted by setting of the adjusting devices, so that the floors 3 may simulate an actual slope. A shape of a local position may be changed by setting of the additional blocks 4, and surveying and mapping results of the device when deformation occurs in a local area within the culvert may be simulated. Moreover, the floors 3 are provided with the protrusions 33 to simulate bumps in an actual state.

In the disclosure, an overall length of the simulated flood discharge culvert is 4 m. Considering that horizontal lengths of the floors 3 will decrease when a slope rises, an overall length of the floors 3 is 4.2 m, a width is 1.4 m and a thickness is 30 mm after calculation. The floors 3 may be divided into three sections, each with a length of 1.4 m.

Figure 3:
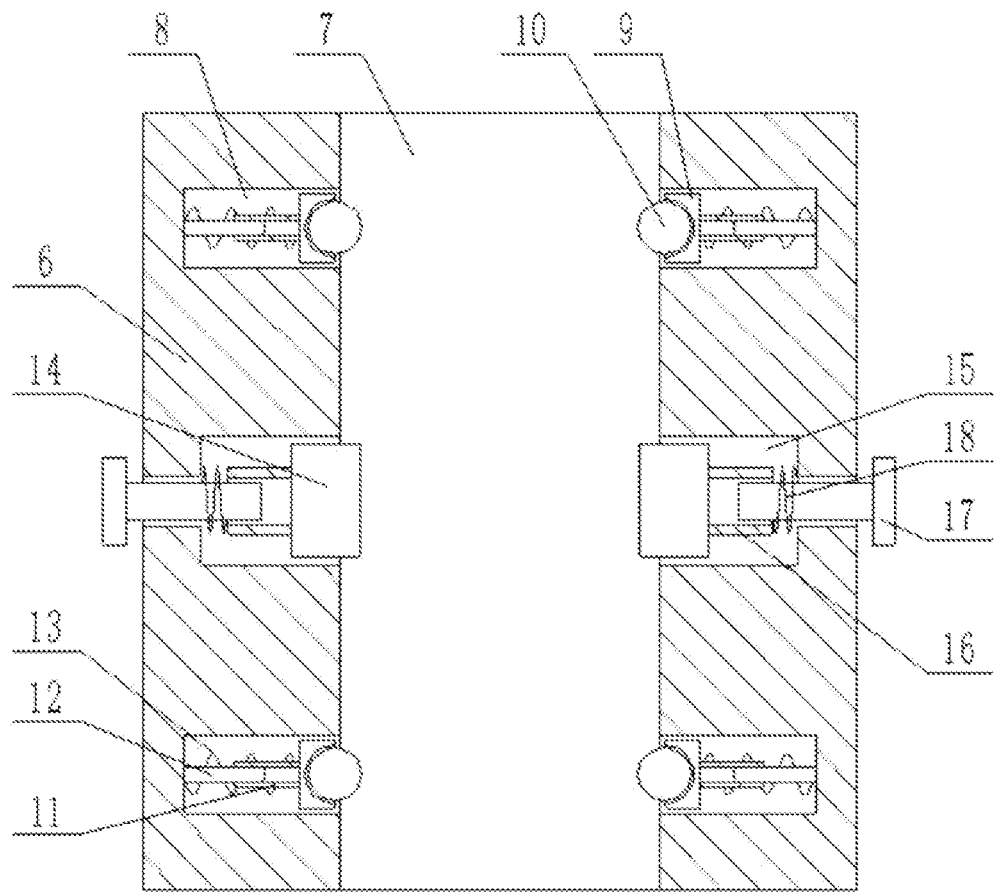
FIG. 3 is a sectional view of a front view of a mounting block according to the disclosure.

In an embodiment, as shown in FIG. 3, each of the connecting devices includes two hinged rods 5, where middle parts of the two hinged rods 5 are hinged by a rotating shaft, and two ends of each of the two hinged rods 5 are respectively hinged with mounting blocks 6, and the mounting blocks 6 are provided with clamping grooves 7. Side walls of the telescopic support rods 1 are fixedly connected with first slide bars 36, and each of the mounting blocks 6 is slidably clamped on corresponding one of the first slide bars 36 through one of the clamping grooves 7. Chutes 8 are formed on two opposite side walls of each of the clamping grooves 7, and ball cups 9 are arranged in the chutes 8, and balls 10 are rotatably arranged on the ball cups 9. The balls 10 are in sliding fit with an outer wall of each of the first slide bars 36. A side of each of the ball cups 9 away from each of the balls 10 is fixedly connected with a sliding sleeve 11, and a second slide bar 12 is slidably connected in the sliding sleeve 11. One end of the second slide bar 12 is fixedly connected in each of the chutes 8, and a first spring 13 is sleeved outside the sliding sleeve 11, and both ends of the first spring 13 are fixedly connected with one of the ball cups 9 and an inner wall of one of the chutes 8 respectively. Limiting pieces are installed on side walls of each of the clamping grooves 7, and the limiting pieces are in limiting fit with side walls of each of the first slide bars 36. The hinged rods 5 are hinged with the mounting blocks 6 through universal balls and ball seats.

Figure 2:
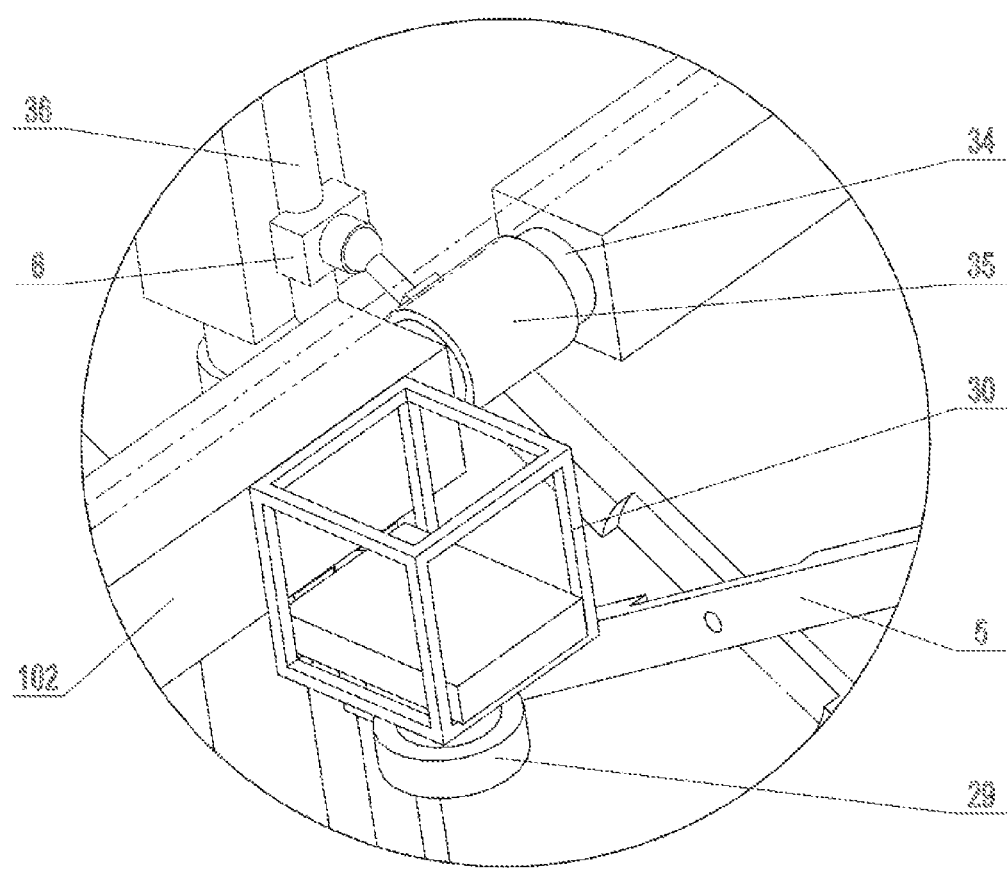
FIG. 2 is an enlarged view at A in FIG. 1.

In an embodiment, as shown in FIG. 2 and FIG. 3, each of the limiting pieces includes an anti-skid block 14. The side walls of each of the clamping grooves 7 are provided with mounting grooves 15, axes of the mounting grooves 15 are perpendicular to an axis of each of the first slide bars 36. The anti-skid block 14 is slidably arranged in each of the mounting grooves 15. One side of the anti-skid block 14 is in contact fit with a side wall of each of the first slide bars 36, and an other side of the anti-skid block 14 is fixedly connected with a sleeve 16. A side wall of each of the mounting grooves 15 is provided with a threaded hole, and the threaded hole is threadedly connected to a bolt 17, and one end of the bolt 17 is sleeved inside the sleeve 16 and abuts against a side of the anti-skid block 14 away from each of the first slide bars 36. An outer wall of the sleeve 16 is sleeved with a second spring 18. One end of the second spring 18 is fixedly connected with an inner wall of each of the mounting grooves 15, and an other end of the second spring 18 is fixedly connected with the anti-skid block 14.

In order to make the device have an effect of folding and recycling, the connecting devices are arranged between the telescopic support rods 1. When the device needs to be unfolded, the bolt 17 on each of the mounting blocks 6 is loosened. Under an action of the second spring 18, the anti-skid block 14 slides into each of the mounting grooves 15. At this time, the balls 10 contact with each of the first slide bars 36 and slide relatively, so that an included angle between two of the hinged rods 5 may be adjusted, and a distance between the two adjacent telescopic support rods 1 may be adjusted. When the device needs to be fixed, the bolt 17 is rotated, so that the anti-skid block 14 abuts against the outer wall of each of the first slide bars 36, and each of the mounting blocks 6 is fixed. The anti-skid block 14 is made of a hard rubber block with a large surface roughness.

Figure 4:
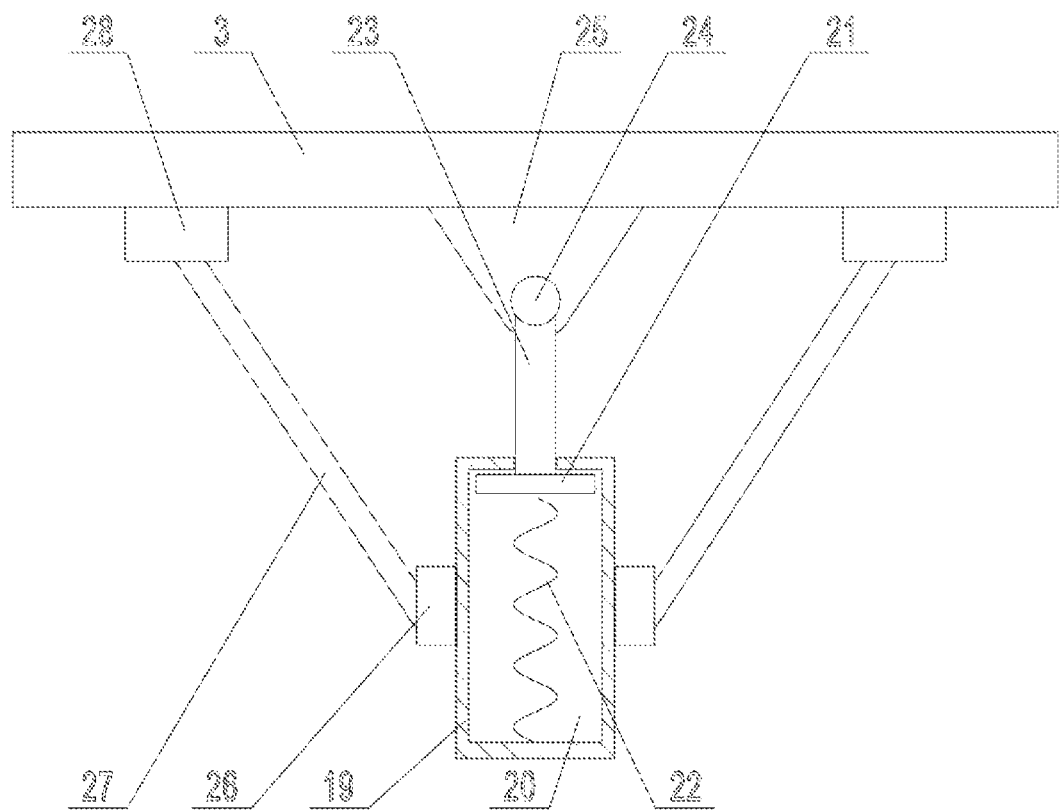
FIG. 4 is a schematic structural diagram of an adjusting device according to the disclosure.

In an embodiment, as shown in FIG. 4, the height adjusting mechanism includes a support block 19, where a cavity 20 is formed in the support block 19, and a cushion block 21 is slidably connected in the cavity 20. A bottom surface of the cushion block 21 is fixedly connected with one end of a third spring 22, and an other end of the third spring 22 is fixedly connected with a bottom wall of the cavity 20. A top end of the cushion block 21 is fixedly connected with a connecting rod 23, where one end of the connecting rod 23 penetrates a top wall of the cavity 20 and fixes a middle section of a connecting shaft 24. The bottom surface of each of the floors 3 is fixedly connected with a bearing seat 25, and the connecting shaft 24 is rotatably connected to the bearing seat 25. The angle adjusting mechanisms are fixedly connected to two sides of the support block 19.

In an embodiment, as shown in FIG. 4, each of the angle adjusting mechanisms includes a fixed block 26 fixedly connected to a side wall of the support block 19, a fixed end of an electric telescopic rod 27 is hinged to one side of the fixed block 26 away from the support block 19, and a fixed plate 28 is hinged to an output end of the electric telescopic rod 27. The fixed plate 28 is slidably connected to a bottom surface of one of the floors 3, and the electric telescopic rod 27 is arranged at an angle with the bottom surface of the one of the floors 3.

When a height needs to be adjusted, the two electric telescopic rods 27 extend or retract at a same distance synchronously. At this time, one of the floors 3 drives the connecting shaft 24 to move through the bearing seat 25, and the connecting shaft 24 drives the connecting rod 23 and the cushion block 21 to slide in the cavity 20 to adjust the height of the one of the floors 3. When the angle of the one of the floors 3 needs to be adjusted, one of the two electric telescopic rods 27 extends and the other retracts, so that the angle of the one of the floors 3 is deflected.

In an embodiment, as shown in FIG. 1, each of the telescopic support rods 1 includes two first connecting rods 101, where top ends of the two first connecting rods 101 are fixedly connected with length adjusting elements, and top ends of the length adjusting elements are fixedly connected with second connecting rods 102. The second connecting rods 102 are arranged in L-shapes, and ends of the two second connecting rods 102 close to each other are provided with one of the length adjusting elements, and the one of the length adjusting elements is fixedly connected with the two second connecting rods 102 respectively, and universal wheels 32 are installed at bottom ends of the first connecting rods 101.

In an embodiment, as shown in FIG. 2, each of the length adjusting elements includes two threaded rods 34, and a threaded sleeve 35 is threadedly connected between the two threaded rods 34, and one end of each of a plurality of threaded rods 34 away from the threaded sleeve is fixedly connected with the top end of each of the first connecting rods 101 and two ends of each of the second connecting rods 102 respectively.

A telescopic change of each of the telescopic support rods 1 is realized by adjusting a distance between the two threaded rods 34 by rotating the threaded sleeve 35, thereby controlling a volume of the culvert.

In an embodiment, as shown in FIG. 1, the lighting part includes a light-emitting diode (led) charging lamp 31, and one of the second connecting rods 102 is fixedly connected with a hook, and the led charging lamp 31 is hung on the hook.

In an embodiment, as shown in FIG. 2, the fog generating device includes a fogger 29, and a mounting bracket 30 is fixedly connected to a side wall of one of the second connecting rods 102 away from the tarpaulin 2, and the fogger 29 is placed on the mounting bracket 30.

In an embodiment, a cross-sectional shape of each of the additional blocks 4 is a regular polygon.

The cross-sectional shape of the additional block 4 is set as the regular polygon, which is convenient to calculate a volume of the additional block 4. Then the volume is compared with data measured by a detector to obtain a detection error value.

A concrete implementation process is as follows. Firstly, the bolt 17 on each of the mounting blocks 6 is loosened. Under the action of the second spring 18, the anti-skid block 14 slides into each of the mounting grooves 15. At this time, the balls 10 contact with each of the first slide bars 36 and slide relatively, so that an included angle between two of the hinged rods 5 may be adjusted. The telescopic support rods 1 are unfolded, and the tarpaulin 2 is covered outside the telescopic support rods 1 after the telescopic support rods 1 are unfolded, so that the device forms the channel with the openings at both ends. Then, the floors 3 are laid in the channel, and the fogger 29, the led charging lamp 31 and the additional block 4 are all installed in the channel and opened. The height and the inclination angle of each of the floors 3 are adjusted by extending or retracting the two electric telescopic rods 27, so that the floors 3 may simulate the actual slope. Finally, the wheeled robot is placed on the floors 3 and travels along the preset route of the floors 3. Signals fed back by the wheeled robot are received by a calculator to construct a culvert model. Finally, the culvert model is compared with an actual model to obtain the error values of the surveying and mapping, providing compensation for the error values for subsequent field surveys.

Embodiment 2

Different from embodiment 1, as shown in FIG. 1 and FIG. 2, cross-sectional shapes of the first slide bars 36 and the clamping grooves 7 are arc-shaped, so that the first slide bars 36 and the clamping grooves 7 may rotate relatively, and the culvert composed of the plurality of telescopic supporting rods 1 may be serpentine to simulate a shape of a flood discharge culvert under an actual condition.

In a description of the disclosure, it should be understood that terms "vertical", "horizontal", "up", "down", "front", "back", "left", "right", "vertical", "horizontal", "top", "bottom", "inside", "outside", and other indications of orientation or positional relationships are based on orientation or positional relationships shown in attached drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by ordinary technicians in the field to the technical scheme of the disclosure shall fall within the protection scope determined by claims of the disclosure.

What is claimed is:

1. A portable simulated flood discharge culvert for surveying and mapping, comprising:

a supporting device, wherein the supporting device comprises a plurality of telescopic support rods, the telescopic support rods have U-shaped structures, and openings of the telescopic support rods are downward;

a tarpaulin, wherein the tarpaulin is covered on outer walls of the telescopic support rods, and a channel with two ends communicated is formed between the plurality of telescopic support rods and the tarpaulin;

connecting devices, wherein each of the connecting devices is installed between any two adjacent telescopic support rods;

floors, wherein a plurality of floors are provided, the plurality of floors are respectively arranged between the plurality of telescopic support rods, and top surfaces of the floors are provided with a plurality of protrusions;

adjusting devices, wherein each of the adjusting devices comprises angle adjusting mechanisms and a height adjusting mechanism, and the angle adjusting mechanisms and the height adjusting mechanism are respectively fixed on a bottom surface of each of the floors, and the angle adjusting mechanisms are fixed on two sides of the height adjusting mechanism;

a fog generating device, wherein the fog generating device is installed on any of the telescopic support rods;

a lighting part, wherein the lighting part is fixedly connected to one of the telescopic support rods located in a middle section; and additional blocks, wherein a plurality of additional blocks are provided, and the plurality of additional blocks are all arranged on the telescopic support rods;

wherein each of the connecting devices comprises two hinged rods, middle parts of the two hinged rods are hinged by a rotating shaft, and two ends of each of the two hinged rods are respectively hinged with mounting blocks, and the mounting blocks are provided with clamping grooves; side walls of the telescopic support rods are fixedly connected with first slide bars, and each of the mounting blocks is slidably clamped on corresponding one of the first slide bars through corresponding one of the clamping grooves; chutes are formed on two opposite side walls of each of the clamping grooves, and ball cups are arranged in the chutes, and balls are rotatably arranged on the ball cups; the balls are in sliding fit with an outer wall of each of the first slide bars; a side of each of the ball cups away from each of the balls is fixedly connected with a sliding sleeve, and a second slide bar is slidably connected in the sliding sleeve; one end of the second slide bar is fixedly connected in each of the chutes, and a first spring is sleeved outside the sliding sleeve, and both ends of the first spring are fixedly connected with corresponding one of the ball cups and an inner wall of corresponding one of the chutes respectively; limiting pieces are installed on side walls of each of the clamping grooves, and the limiting pieces are in limiting fit with side walls of each of the first slide bars; and each of the limiting pieces comprises an anti-skid block; the side walls of each of the clamping grooves are provided with mounting grooves, axes of the mounting grooves are perpendicular to an axis of each of the first slide bars; the anti-skid block is slidably arranged in each of the mounting grooves; one side of the anti-skid block is in contact fit with a side wall of each of the first slide bars, and an other side of the anti-skid block is fixedly connected with a sleeve; a side wall of each of the mounting grooves is provided with a threaded hole, and the threaded hole is threadedly connected to a bolt, and one end of the bolt is sleeved inside the sleeve and abuts against a side of the anti-skid block away from each of the first slide bars; an outer wall of the sleeve is sleeved with a second spring; one end of the second spring is fixedly connected with an inner wall of each of the mounting grooves, and an other end of the second spring is fixedly connected with the anti-skid block.

2. The portable simulated flood discharge culvert for the surveying and mapping according to claim 1, wherein the height adjusting mechanism comprises a support block, a cavity is formed in the support block, and a cushion block is slidably connected in the cavity; a bottom surface of the cushion block is fixedly connected with one end of a third spring, and an other end of the third spring is fixedly connected with a bottom wall of the cavity; a top end of the cushion block is fixedly connected with a connecting rod, one end of the connecting rod penetrates a top wall of the cavity and fixes a middle section of a connecting shaft; the bottom surface of each of the floors is fixedly connected with a bearing seat, and the connecting shaft is rotatably connected to the bearing seat; and the angle adjusting mechanisms are fixedly connected to two sides of the support block.

3. The portable simulated flood discharge culvert for the surveying and mapping according to claim 2, wherein each of the angle adjusting mechanisms comprises a fixed block fixedly connected to a side wall of the support block, a fixed end of an electric telescopic rod is hinged to one side of the fixed block away from the support block, and a fixed plate is hinged to an output end of the electric telescopic rod; the fixed plate is slidably connected to a bottom surface of one of the floors, and the electric telescopic rod is arranged at an angle with the bottom surface of the one of the floors.

4. The portable simulated flood discharge culvert for the surveying and mapping according to claim 1, wherein each of the telescopic support rods comprises two first connecting rods; top ends of the two first connecting rods are fixedly connected with length adjusting elements, and top ends of the length adjusting elements are fixedly connected with second connecting rods; the second connecting rods are arranged in L-shapes, ends of the two second connecting rods close to each other are provided with one of the length adjusting elements, the one of the length adjusting elements is fixedly connected with the two second connecting rods respectively, and universal wheels are installed at bottom ends of the first connecting rods.

5. The portable simulated flood discharge culvert for the surveying and mapping according to claim 4, wherein each of the length adjusting elements comprises two threaded rods, and a threaded sleeve is threadedly connected between the two threaded rods, and one end of each of a plurality of threaded rods away from the threaded sleeve is fixedly connected with the top end of each of the first connecting rods and two ends of each of the second connecting rods respectively.

6. The portable simulated flood discharge culvert for the surveying and mapping according to claim 5, wherein the lighting part comprises a light-emitting diode (led) charging lamp, one of the second connecting rods is fixedly connected with a hook, and the led charging lamp is hung on the hook.

7. The portable simulated flood discharge culvert for the surveying and mapping according to claim 4, wherein the fog generating device comprises a fogger, a mounting bracket is fixedly connected to a side wall of one of the second connecting rods away from the tarpaulin, and the fogger is placed on the mounting bracket.

8. The portable simulated flood discharge culvert for the surveying and mapping according to claim 1, wherein a cross-sectional shape of each of the additional blocks is a regular polygon.

* * * * *